United States Patent
Rambler et al.

(10) Patent No.: US 10,354,242 B2
(45) Date of Patent: Jul. 16, 2019

(54) SCANNER GESTURE RECOGNITION

(71) Applicants: Jason Rambler, Decatur, GA (US); Janry C. Amada, Cebu (PH); Rodolfo Nacu, Jr., Cebu (PH); Jeffrey Yap, Cebu (PH); Nico Ryan James Geguiera Sy, Pagadian (PH); Wilfredo Brigoli Praca, Jr., Liloan (PH); Rafael Leonard Remedio, Consolacion (PH)

(72) Inventors: Jason Rambler, Decatur, GA (US); Janry C. Amada, Cebu (PH); Rodolfo Nacu, Jr., Cebu (PH); Jeffrey Yap, Cebu (PH); Nico Ryan James Geguiera Sy, Pagadian (PH); Wilfredo Brigoli Praca, Jr., Liloan (PH); Rafael Leonard Remedio, Consolacion (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/447,870

(22) Filed: Jul. 31, 2014

(65) Prior Publication Data
US 2016/0078290 A1    Mar. 17, 2016

(51) Int. Cl.
*G06K 9/00* (2006.01)
*G06Q 20/20* (2012.01)
*G07G 1/00* (2006.01)

(52) U.S. Cl.
CPC ......... *G06Q 20/20* (2013.01); *G06K 9/00355* (2013.01); *G06Q 20/208* (2013.01); *G07G 1/00* (2013.01); *G07G 1/0036* (2013.01)

(58) Field of Classification Search
None
See application file for complete search history.

(56) References Cited

U.S. PATENT DOCUMENTS

| | | | | |
|---|---|---|---|---|
| 2007/0211031 A1* | 9/2007 | Marc | ...................... | G06F 3/0304 345/163 |
| 2008/0089587 A1* | 4/2008 | Kim | ........................ | G06F 3/017 382/190 |
| 2011/0218870 A1* | 9/2011 | Shams | .................. | G06Q 20/204 705/17 |
| 2011/0296353 A1* | 12/2011 | Ahmed | .................... | G06F 3/017 715/848 |
| 2012/0224040 A1* | 9/2012 | Wang | ................... | G06K 7/1091 348/77 |
| 2014/0157209 A1* | 6/2014 | Dalal | ...................... | G06F 3/017 715/863 |
| 2014/0222545 A1* | 8/2014 | Hajji | ...................... | G06Q 20/20 705/14.38 |
| 2015/0261299 A1* | 9/2015 | Wajs | ....................... | G06F 3/011 726/19 |

OTHER PUBLICATIONS

HP Retail Integrated Barcode Scanner User Guide, Hewlett-Packard Development Company, L.P., First Edition (Jun. 2013).*

* cited by examiner

*Primary Examiner* — Vu Le
*Assistant Examiner* — Tracy Mangialaschi
(74) *Attorney, Agent, or Firm* — Schwegman, Lundberg & Woessner

(57) ABSTRACT

A scanner having an integrated camera is used to capture gestures made in a field of view of the camera. The captured gestures are translated to scanner commands recognized by the scanner. The scanner executes the recognized commands.

15 Claims, 8 Drawing Sheets

Adjusting Power bar Intensity

Volume Adjustment

Capture Image

SCANNER GESTURE RECOGNITION

BACKGROUND

Point-Of-Sale (POS) devices often include a variety of integrated devices, such as scanners, scales, integrated scanners with scales, card readers with on-screen signature capabilities, and the like.

Some scanners come equipped with both a laser and a camera. This permits a cashier or customer to scan a barcode from two different directions. Generally, the laser operates to detect a bar code that is moved across its line of sight, which is flush with the checkout counter. The camera operates to detect a bar code that is facing the camera and away from the laser. These composite scanners have a variety of buttons and options that the cashier or a service engineer can access for purposes of configuring the scanners and/or adjusting settings on the scanners. This is a cumbersome process and requires the cashier to know what buttons to press on the scanner and in what order or sequence to achieve a desired setting.

Moreover, these types of scanners are often programmed by scanning a series of barcodes across the scanner while the scanner is placed in programming mode. This is actually similar to how computers were programmed many years ago with punch cards. It is an outdated process, which is tedious and fraught with potential errors.

Therefore, improved techniques to communicate with the software/firmware of the scanner are needed to improve usability, reduce costs associated with manufacturing a scanner with multiple buttons, and improve the efficiency and accuracy associated with programming the scanner.

SUMMARY

In various embodiments, methods and a scanner device for gesture-based scanner command recognition are provided.

According to an embodiment, a method for scanner gesture recognition is provided. Specifically, a hand is detected in a field of view of a scanner. Next, an image of the hand is captured as a gesture. Finally, a command is automatically performed on the scanner based on the gesture.

DETAILED DESCRIPTION

Figure 1A:
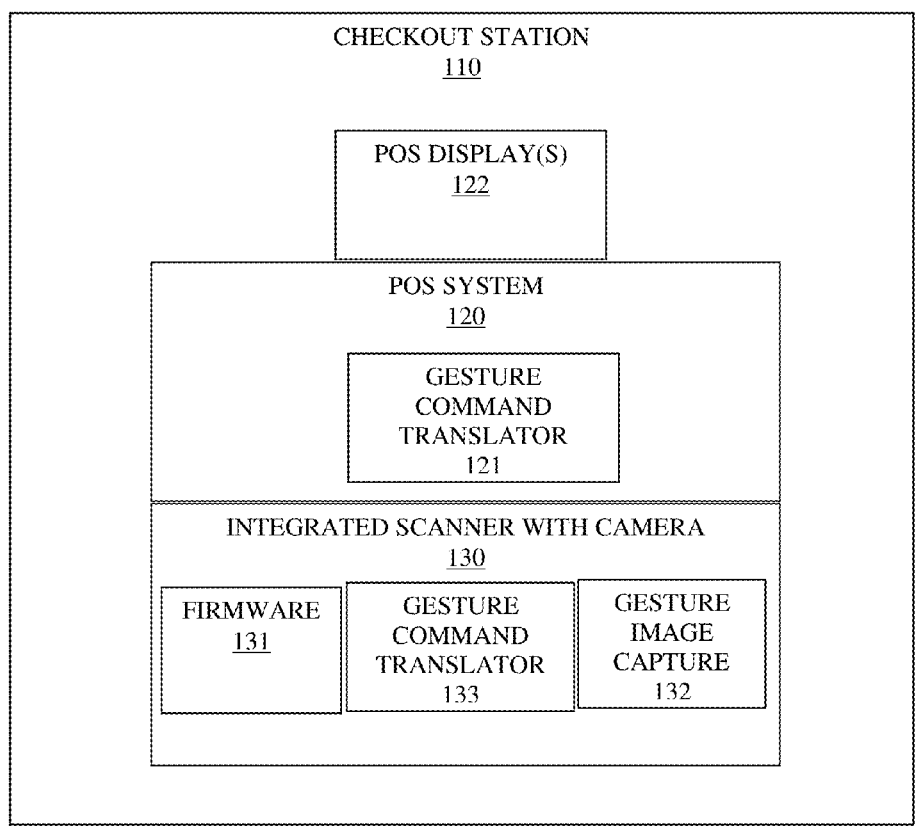
FIG. 1A is a diagram illustrating components of a checkout station having a scanner with an integrated camera that recognizes gestures as scanner commands to process on the scanner, according to an example embodiment.

FIG. 1A is a diagram illustrating components of a checkout station having a scanner with an integrated camera that recognizes gestures as scanner commands to process on the scanner, according to an example embodiment. It is to be noted that the checkout station 110 is shown schematically in greatly simplified form, with only those components relevant to understanding of this embodiment being illustrated. The same situation may be true for the other various components of the checkout station 110.

Furthermore, the various components (that are identified in the FIG. 1) are illustrated and the arrangement of the components is presented for purposes of illustration only. It is to be noted that other arrangements with more or less components are possible without departing from the teachings of scanner gesture recognition, presented herein and below.

Moreover, the methods and scanner presented herein and below (for scanner gesture recognition) may include all or some combination of the components shown with the diagram 100. The methods are programmed as executable instructions in memory and/or non-transitory computer-readable storage media and executed on one or more processors associated with the components/devices.

Specifically, the diagram 100 permits an integrated scanner with camera 130 to capture gestures (such as hand signals) as images using the camera and the gesture image capture 132. The gesture command translator 121 and/or 133 translates or converts the gesture images into commands that are recognizable and processed by the firmware 131 of the integrated scanner with camera 130. The commands can relate to scanner settings, scanner configurations, or scanner programming, and all of which is achieved by hand gestures placed in front of the camera of the integrated scanner with camera 130.

The checkout station 110 includes a Point-Of-Sale (POS) system 120 and an integrated scanner with camera 130. The POS system 120 includes a gesture command translator 121 and one or more POS displays 122. The integrated scanner with camera 130 includes firmware 131, a gesture image capture module 132, and, optionally, a gesture command translator 133.

In an embodiment, the checkout station 110 is a Self-Service (SS) checkout station operated by a customer. Some features available with respect to using gestures to translate and drive the integrated scanner with camera 130 may be disabled in this embodiment for security reasons, such as the ability to program the integrated scanner with camera 130 (may also be referred to herein as "scanner 130") and some configuration commands.

Figure 1B:
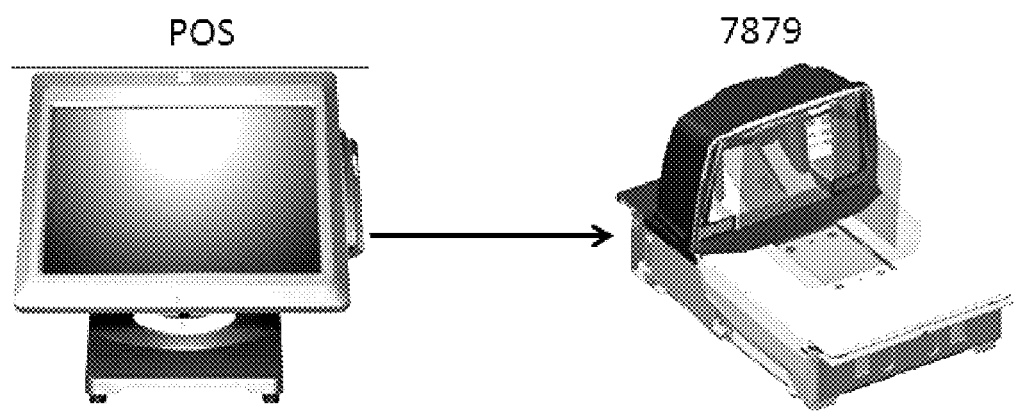
FIG. 1B illustrates a sample Point-Of-Sale (POS) system and a type of scanner having an integrated camera.

FIG. 1B illustrates a sample POS system and a type of scanner having an integrated camera. The scanner type is identified as a 7879 scanner.

Figure 1C:
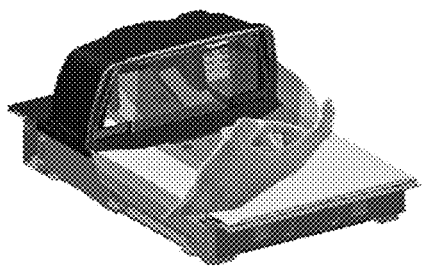
FIG. 1C illustrates a sample gesture to adjust the light bar intensity for a type of scanner having an integrated camera.
Figure 1C:
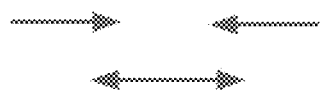
Figure 1C:
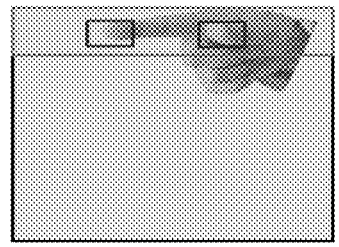

FIG. 1C illustrates a sample gesture to adjust the light bar intensity for a type of scanner having an integrated camera.

Figure 1D:
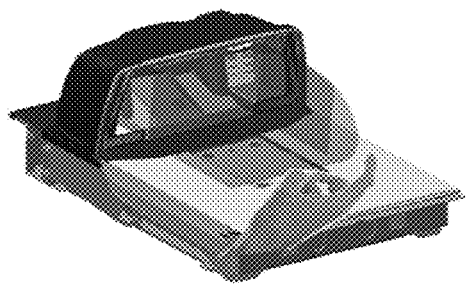
FIG. 1D illustrates a sample gesture to adjust power bar intensity for a type of scanner having an integrated camera.
Figure 1D:
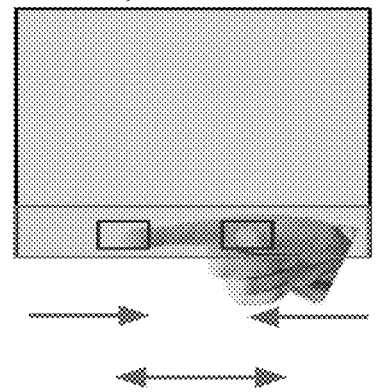

FIG. 1D illustrates a sample gesture to adjust power bar intensity for a type of scanner having an integrated camera.

Figure 1E:
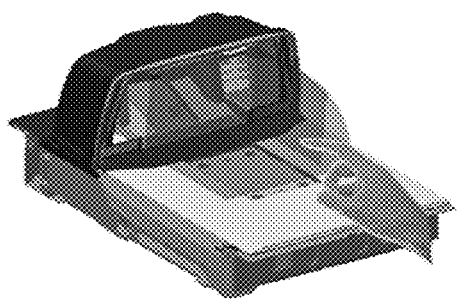
FIG. 1E illustrates a sample gesture to adjust volume for a type of scanner having an integrated camera.
Figure 1E:
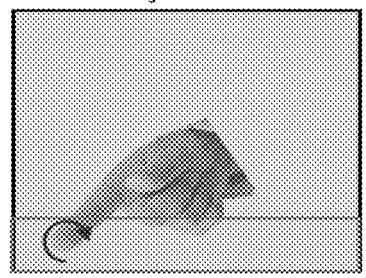

FIG. 1E illustrates a sample gesture to adjust volume for a type of scanner having an integrated camera.

Figure 1F:
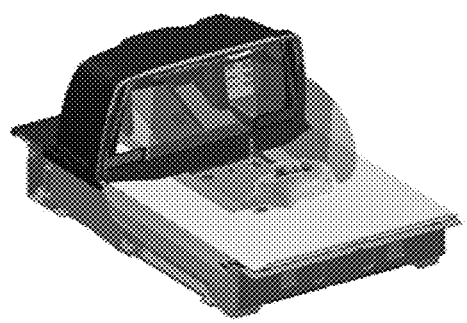
FIG. 1F illustrates a sample gesture to take a picture by a type of scanner having an integrated camera.
Figure 1F:
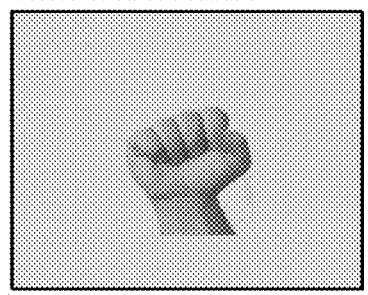

FIG. 1F illustrates a sample gesture to take a picture by a type of scanner having an integrated camera.

Figure 1G:
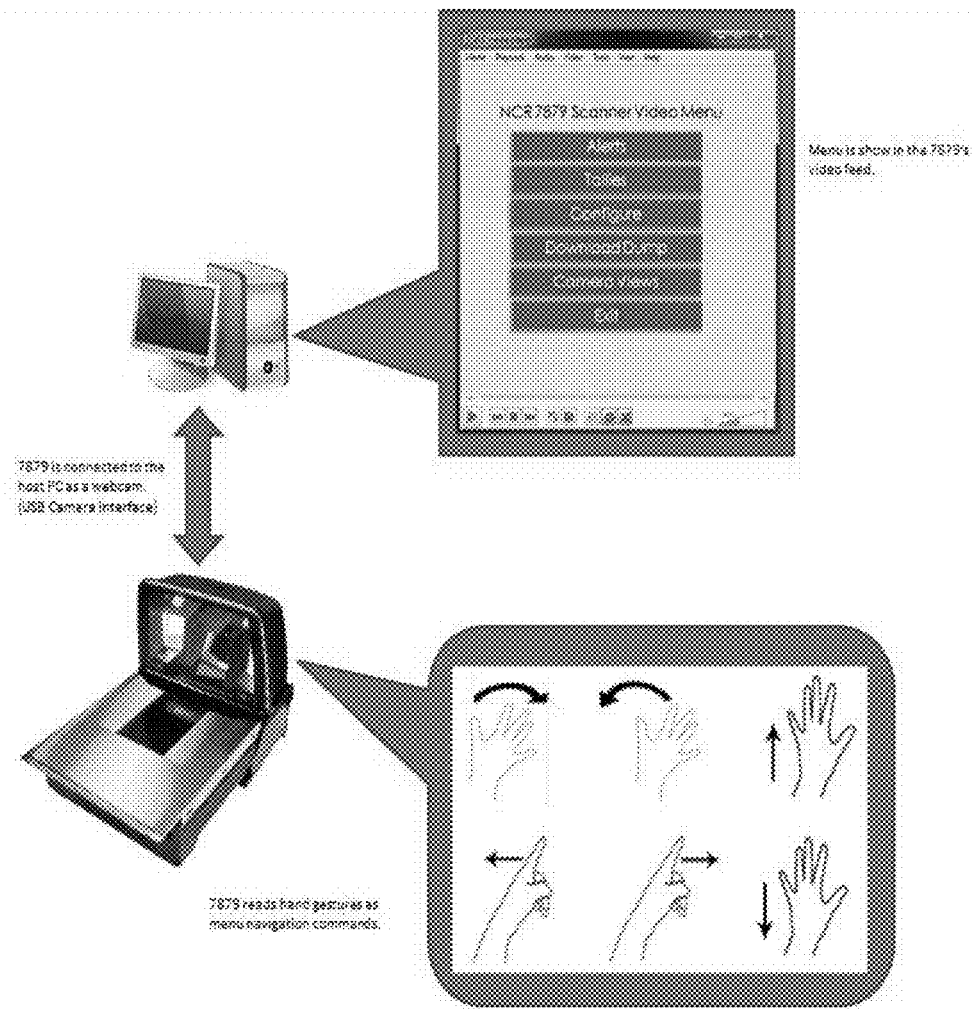
FIG. 1G illustrates sample gestures in front of a type of scanner having an integrated camera that drives scanner configuration menu options on a display.

FIG. 1G illustrates sample gestures in front of a type of scanner having an integrated camera that drives scanner configuration menu options on a display.

During operation, the checkout station 110 places goods or services in the field of view of the scanner 130. The barcodes are either scanned by a laser or captured by the camera and communicated to the POS system 120.

However, unlike traditional scanner operation the cashier, a customer (using a self-service checkout), and/or a service engineer (who services the scanner 130), can use gestures placed in front of the camera for the scanner 130 (some of which were illustrated in the FIGS. 1B-1G). When the camera identifies the hand in the field of view it takes a picture or series of pictures (when movement is involved) and passes the image or series of images representing movement to the gesture image capture module 132.

The gesture images are passed from the scanner 130 to the gesture command translator 121 of the POS system 120. The gesture images are matched to known command images and translated into scanner commands mapped to the known command images by the gesture command translator 121. The POS system 120 is equipped with an Application Programming Interface (API) to communicate the scanner commands to the firmware 131 of the scanner 130 for execution. These commands can achieve a variety of functions on the scanner, such as but not limited to: zeroing the weight scale of the POS system 120, adjusting volume of the scanner 130 that confirms a successful barcode scan, adjusts brightness of the scanner 130, adjusts the intensity of the scanner 130, adjust the tones used with the scanner, take a picture (such as after a time lag where a customer check or license is being imaged), putting the scanner 130 into a configuration mode and having the configuration menus displayed on one of the displays 122, putting the scanner into programming mode (such that a series of subsequent gestures results in programming the scanner), and the like.

Some customer-based gestures can be defined as well, such as, but not limited to: a gesture requesting customer assistance at the checkout station 110, a gesture indicating the customer is deaf so the scanner 130 should emit light colors as confirmations of successful scans, a gesture indicating the customer is sight impaired so the scanner 130 should use more distinguishable tones and louder volumes as confirmations of successful scans, and the like.

In an embodiment, the scanner 130 includes the gesture command translator 133, such that the scanner does not need the POS system 120 to translate the gestures into commands that can be processed by the firmware of the scanner 130.

In an embodiment, instead of a series of individual images to detect movement, the scanner 130 may include a video camera such that video can be captured representing a series of movements associated with some of the gestures. This can be an integrated video camera or one that is interfaced to the scanner 130, such as through a port (Universal Serial Bus (USB) port).

So, gestures that include movement and direction of movement can be captured as a series of images in quick succession or can be captured as video by the scanner 130. The gesture image capture 132 then either sends to the gesture command translator 121 of the POS system 120 or provides to the gesture command translator 133 when built into the scanner 130. The gestures are translated into firmware commands recognized by the firmware 131 of the scanner 130 and processed on the scanner 130 (using one or more processors of the scanner 130) to perform one or more actions on the scanner (as discussed above). These actions can be a single action, such as adjust the volume or take a picture, a series of actions for a new scanner application that was programmed into the scanner, or an interactive session with the scanner 130 where multiple actions are selected (such as when the scanner 130 is placed in its configuration menu).

In an embodiment, the scanner 130 does not have to include the gesture image capture module 132; rather, the images, series of images, or video can be streamed directly to the POS system 120 for processing.

One now appreciates how a camera and/or video camera of a scanner 130 can be configured to recognize gestures as commands to the scanner 130. This can provide for more efficient scanner 130 operation, allows less skilled employees to configure the scanner 130 (such as a cashier as opposed to a service engineer, permits cashiers or customers to customize scanner operation for a particular transaction or all transactions, reduces the cost of manufacture associated with scanners because control and operation buttons can be removed or reduced substantially, and permits programming of the scanner to occur without scanning a series of special barcodes when the scanner is in a programming mode. Other benefits may exist as well and are intended to fall within the generous scope of the embodiments discussed herein.

These and other embodiments are now discussed with reference to the FIGS. 2-4.

Figure 2:
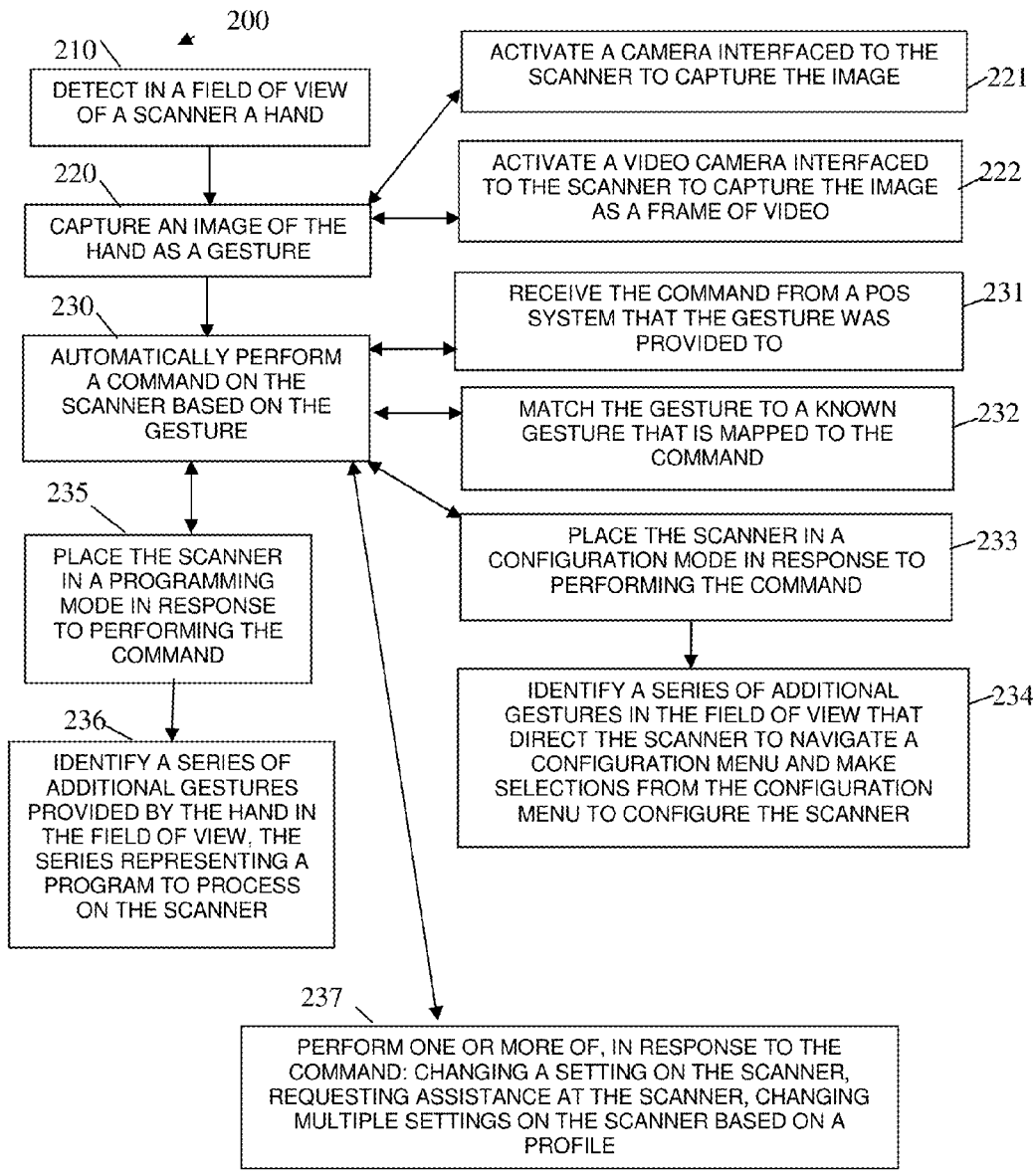
FIG. 2 is a diagram of a method for scanner gesture recognition, according to an example embodiment.

FIG. 2 is a diagram of a method 200 for scanner gesture recognition, according to an example embodiment. The software module(s) that implements the method 200 is referred to as a "scanner gesture manager." The scanner gesture manager is implemented as executable instructions programmed and residing within memory and/or a non-transitory computer-readable (processor-readable) storage medium and executed by one or more processors of a scanner. The processor(s) of the scanner that executes the scanner gesture manager are specifically configured and programmed to process the scanner gesture manager. The scanner gesture manager may, but does not have to have, access to a network during its processing. The network can be wired, wireless, or a combination of wired and wireless.

In an embodiment, the scanner is the scanner 130 of the FIG. 1.

In an embodiment, the scanner gesture manager is the gesture image capture module 132 of the FIG. 1.

In an embodiment, the scanner gesture manager is a combination of the gesture image capture module 132 and the gesture command translator 133 of the FIG. 1.

In an embodiment, the scanner having the scanner gesture manager is integrated into or interfaced with a POS system.

In an embodiment, the POS system is the POS system 120 of the FIG. 1.

At 210, the scanner gesture manager detects within a field of view of the scanner a hand. Any hand recognition software may be used to detect the presence of the hand in view of the scanner.

At 220, the scanner gesture manager captures an image of the hand as a gesture. That is, the hand recognition indicates that a potential gesture or set of gestures is occurring in front of the field of view of the camera integrated into the scanner. An image of the gesture is captured.

In an embodiment, at 221, the scanner gesture manager activates a camera interfaced or integrated into the scanner to capture the image.

In an embodiment, at 222, the scanner gesture manager activates a video camera interfaced to the scanner to capture the image as a frame or set of frames of video. The hand may be making movement or motions, which are captured in the frames of the video. It may also be that successive quick images are taken as the hand is moving to form a video of the hand movements.

Examples associated with some hand gestures were presented above in the FIGS. 1B-1G.

At 230, the scanner gesture manager automatically performs a command on the scanner based on the gesture. That is, the image is translated into a firmware or API command that the scanner can process.

In an embodiment, at 231, the scanner gesture manager receives the command from a POS system that the gesture was provided to. That is, the POS system translates the gesture into a command and provides it back to the scanner for execution.

According to an embodiment, at 232, the scanner gesture manager matches the gesture to a known gesture; the known gesture is mapped to the command. It is noted that this is but one approach that can be used to translate the gesture image into a recognizable scanner command; other approaches can be used as well without departing from the beneficial teachings presented herein.

In an embodiment, at 233, the scanner gesture manager placing the scanner in a configuration mode of operation for the scanner in response to performing (processing) the command on the scanner.

In an embodiment of 233 and at 234, the scanner gesture manager identifies a series of additional gestures made by the hand or a different hand in the field of view. The additional gestures direct the scanner to navigate a configuration menu and make selections from the configuration menu to configure the scanner. An example of a configuration menu was presented above in the FIG. 1G.

In an embodiment, at 235, the scanner gesture manager places the scanner in a programming mode of operation for the scanner in response to performing (processing) the command on the scanner.

In an embodiment of 235 and at 236, the scanner gesture manager identifies a series of additional gestures made by the hand or a different hand in the field of view. The series of additional gestures represent a program that is to be processed on the scanner. So, rather than scanning bar code in a traditional situation to program a scanner, with the techniques herein hand gestures can be used to program the scanner.

In an embodiment, at 237, the scanner gesture manager performs one or more of, in response to performing the command: changes a setting on the scanner, requesting assistance at the scanner, changing multiple settings simultaneously based on a profile. That is, a particular cashier may have a unique hand gesture that identifies a profile and the profile makes a number of setting changes that the cashier prefers when operating a POS system. So, customized hand gestures may be used or a single hand gesture can result in a series of commands that are processed on the scanner.

Figure 3:
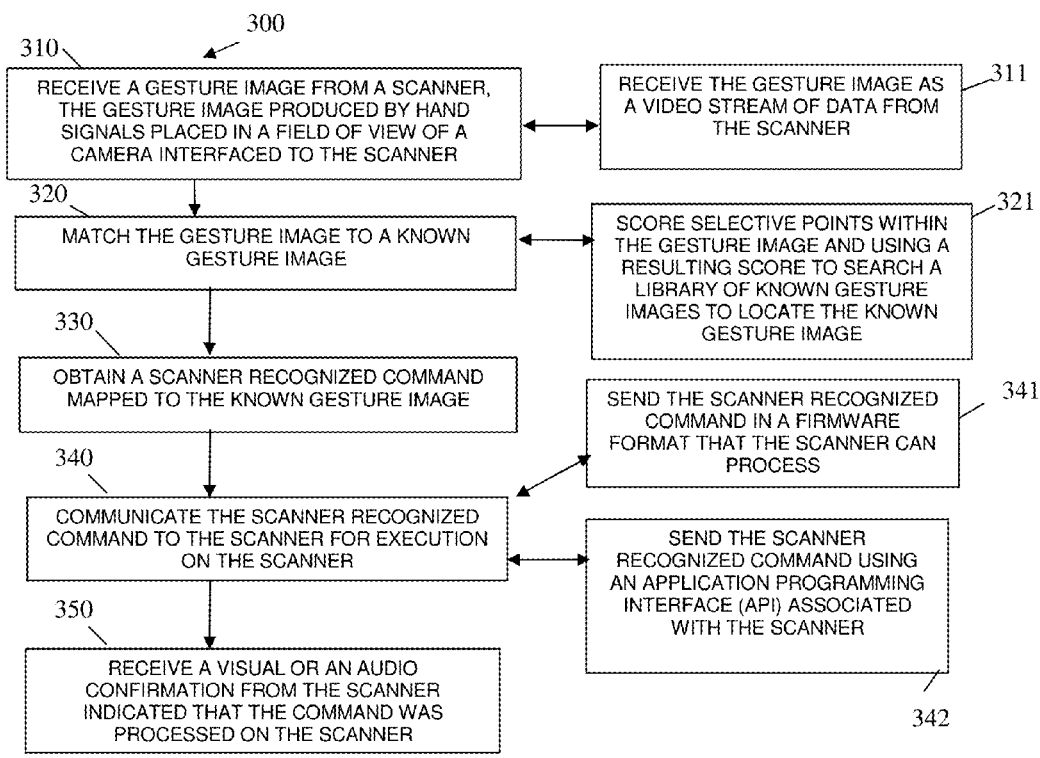
FIG. 3 is a diagram of another method for scanner gesture recognition, according to an example embodiment.

FIG. 3 is a diagram of another method 300 for scanner gesture recognition, according to an example embodiment. The software module(s) that implements the method 300 is referred to as a "POS gesture manager." The POS gesture manager is implemented as executable instructions programmed and residing within memory and/or a non-transitory computer-readable (processor-readable) storage medium and executed by one or more processors of a POS system. The processors that execute the POS gesture manager are specifically configured and programmed to process the POS gesture manager. The POS gesture manager may or may not have access to one or more networks during its processing. Each network can be wired, wireless, or a combination of wired and wireless.

The POS gesture manager depicts processing from a POS system that interacts with a scanner that recognizes gestures.

In an embodiment, the POS system is the POS system 120 of the FIG. 1.

In an embodiment, the POS gesture manager is the gesture command translator 121 of the FIG. 1.

In an embodiment, the scanner that the POS gesture manager interacts with is the scanner 130 of the FIG. 1.

At 310, the POS gesture manager receives a gesture image from a scanner. The gesture image produced by hand signals placed in a field of view of a camera interfaced to or integrated into the scanner.

In an embodiment, at 311, the POS gesture manager receives the gesture image as a video stream of data from the scanner. In this embodiment, the camera is also a video camera or video capable.

At 320, the POS gesture manager matches the gesture image to a known gesture image. That is, an entire set of commands for the scanner can be represented by a gesture. Moreover, one gesture can represent a subset of commands or activate a known program that processes multiple commands.

In an embodiment, at 321, the POS gesture manager scores selective points within the gesture image and uses a resulting score to search a library of known gesture images that match the resulting score for purposes of locating the known gesture image. Again, it is noted that other approaches for identifying a particular gesture image can be used without departing from the beneficial teachings provided herein.

At 330, the POS gesture manager obtains a scanner recognized command mapped to the known and matched gesture image.

In an embodiment, at 231, the POS gesture manager sends the scanner recognized command in a firmware format that the scanner can process.

In another case, at 232, the POS gesture manager sending the scanner recognized command using an API associated with the scanner.

At 240, the POS gesture manager communicates the scanner recognized command to the scanner for execution on the scanner.

According to an embodiment, at 250, the POS gesture manager receives a visual or an audio confirmation from the scanner indicating that the command was received and processed on the scanner. This can be a tone or a colored light or a sequence of tones and lights.

Figure 4:
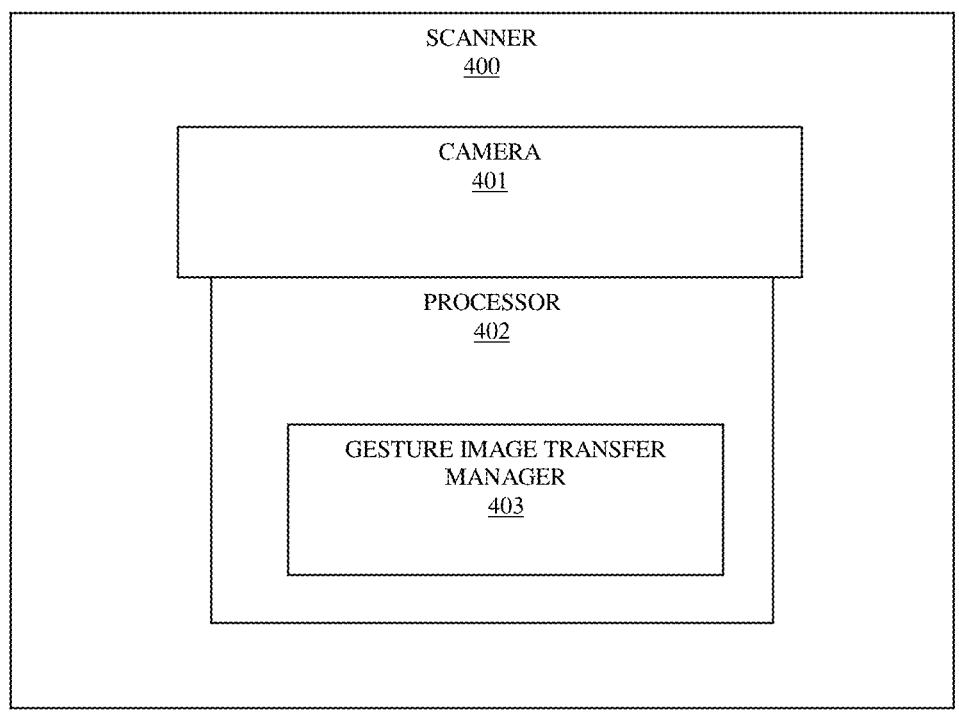
FIG. 4 is a diagram of scanner, according to an example embodiment.

FIG. 4 is a diagram of scanner 400, according to an example embodiment. Some components of the scanner 400 are programmed and reside within memory and/or a non-transitory computer-readable medium and execute on one or more processors of the scanner 400. The scanner 400 may or may not communicate over one or more networks, which can be wired, wireless, or a combination of wired and wireless.

In an embodiment, the scanner 400 is the scanner 130 of the FIG. 1.

In an embodiment, the scanner is integrated or interfaced to the POS system 120 of the FIG. 1.

The scanner 400 includes a camera 401, a processor 402, and a gesture image transfer manager 403.

The camera 401 is adapted and configured to capture images of gestures placed in a field of view of the camera 401.

In an embodiment, the camera 401 is also a video camera adapted to capture a video of a series of gestures placed in a field of view of the video camera.

The gesture image transfer manager 403 is adapted and configured to: execute on the processor 402, transfer the images of the gestures to the POS system, receive commands represented by the images of the gestures from the POS system, and execute on the processor 402 the commands received from the POS system.

In an embodiment, the gesture image transfer manager 403 streams the images to the POS system.

In an embodiment, the gesture image transfer manager 403 receives the commands in a firmware format for firmware of the scanner 400.

In an embodiment, the gesture image transfer manager 403 is the gesture image capture module 132 of the FIG. 1.

In an embodiment, the gesture image transfer manager 403 is both the gesture image capture module 132 and the firmware 131 of the FIG. 1.

In an embodiment, the gesture image transfer manager 403 is the method 200 of the FIG. 2 and the embodiments relevant to the method 200 are incorporated by reference herein with the gesture image transfer manager 403.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting in a field of view of a scanner a hand;
   capturing an image of the hand as a gesture;
   analyzing the image of the hand by firmware on the scanner;
   receiving and identifying a command from the firmware based upon the analysis of the image, and wherein receiving further includes identifying the command from a plurality of scanner function commands that include scanner configuration commands, scanner setting commands, and scanner programming commands; and
   automatically performing the command on the scanner, wherein automatically performing further includes disabling or ignoring the command when the command is directed to one of the scanner programming commands and when the scanner is integrated into a Point-Of-Sale (POS) terminal and the POS terminal is operating in a Self-Service Terminal (SST) mode of operation.

2. The method of claim 1, wherein capturing further includes activating a camera interfaced to the scanner to capture the image.

3. The method of claim 1, wherein capturing further includes activating a video camera interfaced to the scanner to capture the image as a frame of video.

4. The method of claim 1, wherein the analysis includes matching the gesture to a known gesture that is mapped to the command.

5. The method of claim 1, wherein automatically performing further includes placing the scanner in a configuration mode in response to performing the command.

6. The method of claim 5 further comprising, identifying a series of additional gestures in the field of view that direct the scanner to navigate a configuration menu of the scanner that is displayed on a display of the POS terminal for making selections from the configuration menu to configure the scanner.

7. The method of claim 1, wherein automatically performing further includes placing the scanner in a programming mode in response to performing the command and when the POS terminal is operating in a cashier-assisted mode of operation.

8. The method of claim 7 further comprising, identifying a series of additional gestures provided by the hand in the field of view, the series representing a program to process on the scanner while the POS terminal is operating in the cashier-assisted mode of operation.

9. The method of claim 1, wherein automatically performing further includes performing one or more of, in response to the command: changing a setting on the scanner, requesting assistance at the scanner, changing multiple settings on the scanner based on a profile.

10. A method, comprising:
    receiving a gesture image by firmware of a scanner integrated into a Point-Of-Sale (POS) terminal, the gesture image produced by hand signals placed in a field of view of a camera interfaced to the scanner;
    matching, by the firmware of the scanner, the gesture image to a known gesture image;
    obtaining and identifying a scanner recognized command mapped to the known gesture image from the firmware, wherein obtaining further includes identifying the scanner recognized command from a plurality of scanner function commands that include scanner configuration commands, scanner setting commands, and scanner programming commands; and
    communicating by the firmware the scanner recognized command to the scanner for execution on the scanner and disabling or ignoring the scanner recognized command by the scanner when the POS terminal is operating in a Self-Service mode of operation.

11. The method of claim 10, wherein receiving further includes receiving the gesture image as a video stream of data from the scanner.

12. The method of claim 10, wherein matching further includes scoring selective points within the gesture image and using a resulting score to search a library of known gesture images to locate the known gesture image.

13. The method of claim 10 further comprising, activating a visual or an audio confirmation by the scanner indicating to an operator of the POS terminal that the command was processed on the scanner.

14. A scanner, comprising:
- a camera adapted and configured to capture images of gestures placed in a field of view of the camera;
- a processor; and
- a gesture image manager adapted and configured to: i) execute on the processor of the scanner, ii) translate the images of the gestures to scanner recognized commands, and iii) process the scanner recognized commands on the scanner unless any of the scanner recognized commands are identified as scanner programming commands and a Point-Of-Sale (POS) terminal that the scanner is integrated into is in a Self-Service Terminal (SST) mode of operation in which case the scanner recognized commands are ignored or disabled for processing by the scanner.

15. The scanner of claim 14, wherein the camera is a video camera.

* * * * *